United States Patent [19]

Shinohara et al.

[11] Patent Number: 5,070,420
[45] Date of Patent: Dec. 3, 1991

[54] MAGNETIC DISK DRIVE

[75] Inventors: Tohru Shinohara, Kawasaki; Hiroshi Tsurumi, Inagi, both of Japan

[73] Assignee: Fujitsu Limited, Kawasaki, Japan

[21] Appl. No.: 443,367

[22] Filed: Nov. 30, 1989

[30] Foreign Application Priority Data

Nov. 30, 1988 [JP] Japan .................. 63-303009

[51] Int. Cl.⁵ ............................................. G11B 5/54
[52] U.S. Cl. ........................................................ 360/75
[58] Field of Search ........................................ 360/75

[56] References Cited

U.S. PATENT DOCUMENTS

| | | | |
|---|---|---|---|
| 4,530,021 | 7/1985 | Cameron | 360/103 |
| 4,589,036 | 5/1986 | Bertschy | 360/75 |
| 4,897,743 | 1/1990 | Kohno | 360/75 |
| 4,907,106 | 3/1990 | Yamada | 360/75 |

FOREIGN PATENT DOCUMENTS 61-198480 9/1986 Japan .

Primary Examiner—Robert S. Tupper
Attorney, Agent, or Firm—Staas & Halsey

[57] ABSTRACT

A magnetic disk drive which releases adhesion between a magnetic head and a magnetic disk by radially moving the head before the disk begins to rotate. The head movement is accomplished by compressing an elastic stopper by driving a head actuator motor with drive current which flows at half of the voltage previously applied to a motor drive circuit. This is accomplished by grounding one terminal of the motor and forcing all of the motor drive transistors OFF except for one transistor in the motor drive circuit. This provides the benefit that smaller and cheaper transistors can be used and power consumption is considerably reduced, thus contributing to a smaller, cheaper drive circuit which consumes less power.

7 Claims, 7 Drawing Sheets

MAGNETIC DISK DRIVE

BACKGROUND OF THE INVENTION (1) Field of the Invention

The present invention relates to a magnetic disk drive in which a motor coil for moving a magnetic head carrier is energized with a small current to release the adhesion on the magnetic head by an adhesion control circuit in the drive circuit for driving the motor before the rotation of the magnetic disk, and which is able to use smaller and cheaper transistors for the motor drive amplifier in a drive circuit, thereby reducing power consumption.

(2) Description of the Related Art

Magnetic disk drives are devices in which a magnetic head is positioned on a specific track of a rotating magnetic disk, in order to read data from, or write data to that track. The magnetic head floats on the surface of the disk because of the air flowing over it via the rotation of the disk, and thus the head can perform non-contact read-write operations. When the magnetic disk is not rotating, the head is touching the magnetic disk.

Presently, most magnetic disk drives employ a so-called CSS or "Contact Start Stop" system in which the head contacts the disk surface when the disk is not rotating. This system is practical because miniaturization of the head has reduced the amount of pressure on the disk from the head. The use of much cleaner air in the disk housing and the use of a lubricant also aid in making the system practical. The lubricant reduces dynamic friction between the head and the disk when starting and stopping the rotation of the disk and reduces damage if the head either crashes onto the disk due to mechanical shock or the head forces dust into the disk.

However, because heads are continuing to be further miniaturized, and because the finish of both the head and disk surfaces are continuously being made smoother, the head tends to adhere to the disk surface when the disk is not being rotated. This adhesion is caused by a kind of attractive force which can occur between two mirror smooth surfaces. This adhesion becomes stronger with presence of the lubricant, and would cause serious damage to the head, its suspension structure or the disk when the magnetic disk is rotated, if not released properly.

For this reason, before starting to rotate the magnetic disk, the adhesion must be released by pulling the magnetic head in the radial direction of the magnetic disk. To ensure the release of the adhesion before starting to rotate the disk, conventional magnetic disk drives employ a specific release mechanism. This mechanism moves a head actuator along the radial direction of the disk before the disk starts to rotate. Since the suspension structure gimbals have enough stiffness in the radial direction, the head can be released from the adhesion without causing any damage to the gimbals.

Several ways of moving the head have been proposed. In U.S. Pat. Nos. 4,530,021 and 4,589,036 the head is supplied with an alternating current to cause "micromotion" when starting rotation of the disk. Further, in U.S. Pat. No. 4,589,036, actual movement of the head is sensed and the "micromotion" is controlled thereby. However, these methods require a precisely controlled alternating current generator and sophisticated sensing circuits.

Another method, which uses a much simpler circuit, is disclosed in Japanese Unexamined Patent Publication No. 61-198480 (published Sept. 9, 1986). In this method, when the magnetic disk drive is stopped, the head actuator is positioned, close to a stopper means. The stopper means restricts the actuator movement and comprises an elastic material. Upon starting up the disk drive, the head actuator is moved towards the stopper and compresses the elastic material. This causes the head to be slightly offset in the radial direction before the disk actually begins to rotate. This method requires only a head actuator drive current large enough to compress the elastic material. A square waveform is used as the drive current, because the movement of the actuator is safely restricted by the stopper.

However, the inventor of present invention has discovered that the above described method requires a high power consumption transistor in an amplifier for energizing the coil of the head actuator motor, thereby making the amplifier larger in scale, higher in price, and greater in power consumption.

SUMMARY OF THE INVENTION

The object of the present invention is to provide a magnetic disk drive which can release the adhesion of the magnetic head, enabling a small size, lower price, and lower power consumption drive circuit for driving a head actuator motor through a reduction in the voltage applied to the transistors thereof.

According to the present invention, a drive circuit for driving the head actuator motor of the magnetic disk drive is composed of a coil-drive-circuit including four transistors arranged in a bridge shape for energizing the coil of the motor. One pair of opposite transistor junctions are connected to the first and the second power source respectively. The other pair of transistor junctions are connected to both ends of the coil. A pair of control amplifiers for controlling the coil-drive-circuit, and an adhesion control circuit for controlling the amplifier to release the adhesion of the magnetic head before the rotation of the disk are provided. When an adhesion release command from a control circuit of the magnetic disk drive is applied to the adhesion control circuit before the rotation of the disk, only one of four transistors connected to one end of the coil is turned ON. The opposing end of the coil is connected to the medium level point between the first and second power sources by the adhesion control circuit to energize the coil in one direction. In this way, only a half level voltage is applied to the coil and the transistor during an adhesion release operation. This results in the reduction of pressure on the working transistor, permitting the construction of a smaller and cheaper drive which consumes less power.

BRIEF DESCRIPTION OF THE DRAWINGS

The present invention will be more clearly understood from the description below with reference to the accompanying drawings, wherein.

DESCRIPTION OF THE PREFERRED EMBODIMENTS

Before describing the preferred embodiments, an explanation will be given of the conventional magnetic disk drive shown in FIGS. 1, 2, 3A, and 3B.

Figure 1:
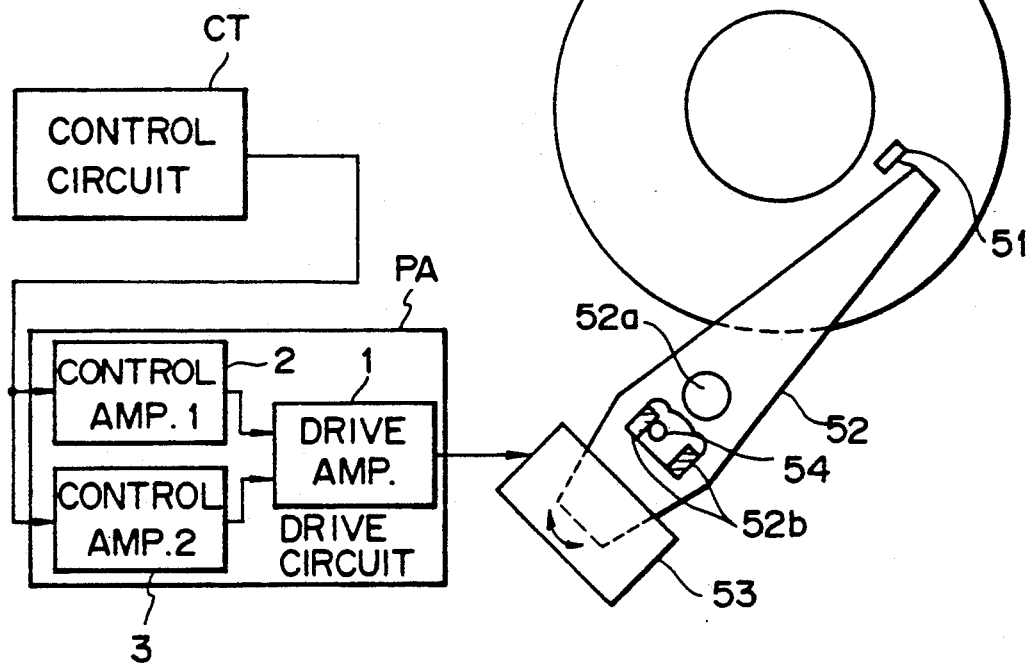
FIG. 1 is a partial plane view and block diagram of a conventional magnetic disk drive.

FIG. 1 is a conventional magnetic disk drive. The magnetic disk drive uses a motor 53 to rotate a carrier (swing arm type head actuator) 52 which revolves around an axis 52a with respect to rotating magnetic disk 50, and position a magnetic head 51 mounted on the tip of the carrier 52 at a specified track of the magnetic disk 50. In carrier 53, there is provided a pair of stoppers 52b which restrict the range of movement in relation to a fixed pole 54. These stoppers are made of an elastic material.

The motor 53 is driven by drive circuit PA via a control signal from the control circuit CT. In the drive circuit, there is provided a drive amplifier 1 to drive the motor 53 and a pair of control amplifiers 2, 3 to control the drive amplifier 1 in accordance with the control signal applied from the control circuit CT. When the disk 50 stops rotating, the carrier 52 is positioned in the CSS zone touching one of the stoppers 52b to the fixed pole 54 by the control circuit CT as shown in FIG. 1.

Before starting rotation of the magnetic disk 50, an adhesion release operation is performed by driving the motor 53 to rotate against the fixed pole 54 so that one of the stoppers 52b of carrier 52 is compressed by the fixed pole 54. This causes the magnetic head 51 to be slightly offset in the radial direction.

Figure 2:
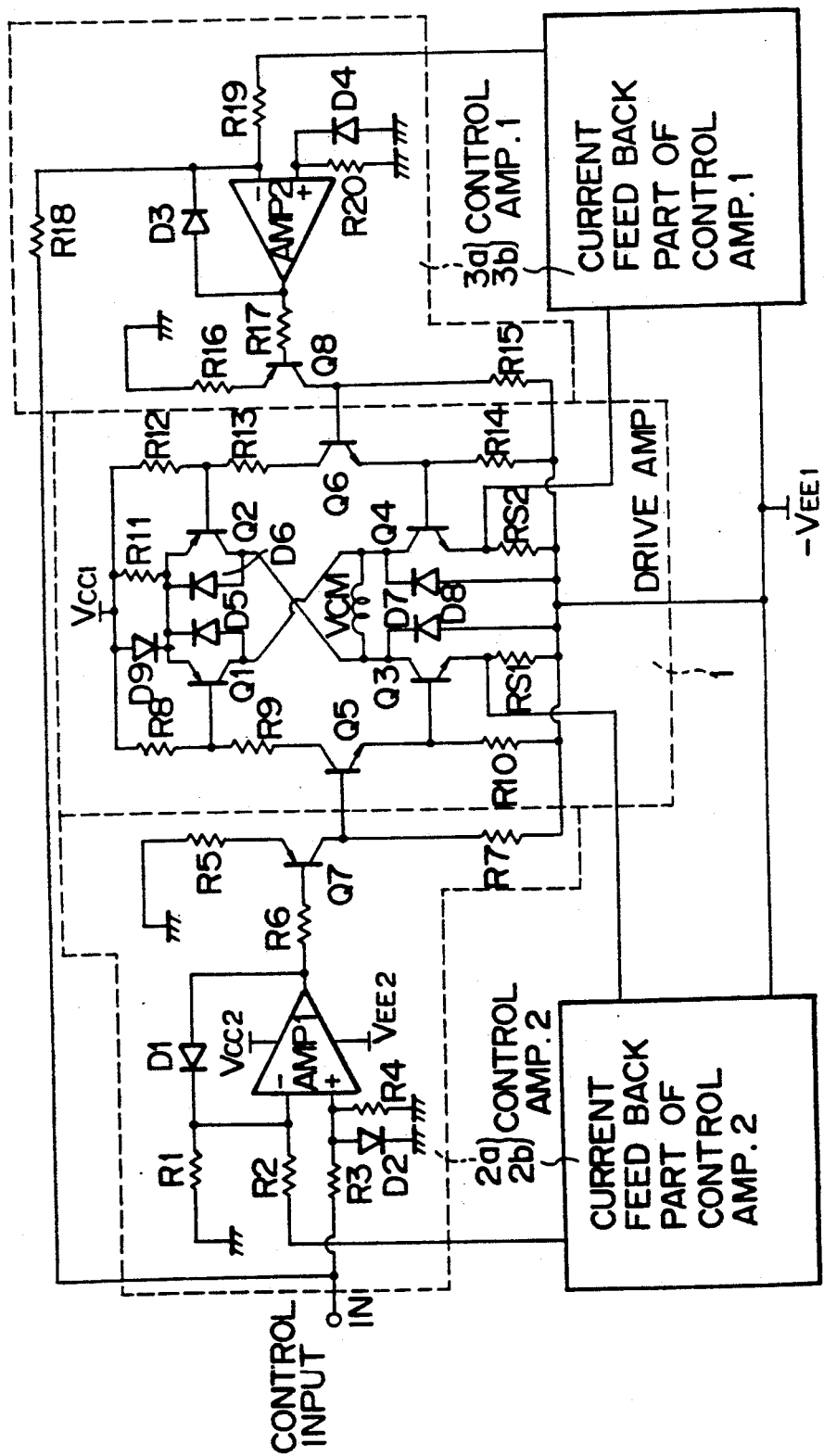
FIG. 2 is a circuit diagram of a conventional magnetic head actuator motor drive.

FIG. 2 is a circuit diagram of a conventional configuration of the drive circuit PA. The drive amplifier 1 has four transistors Q1–Q4 connected in a bridge configuration or in an H configuration (called a balanced H-type push-pull amplifier circuit) with respect to the coil VCM of the head actuator motor 53 which is driven by the transistors, the emitter sides of the upper transistors Q1 and Q2 are commonly connected to the first (positive) power source $V_{CC1}$ via a diode D9 and resistor R11. The emitter side of the lower transistors Q3 and Q4 are commonly connected to the second (negative) voltage supply $V_{EE1}$ via current detector resistors RS1 and RS2.

A transistor Q5 for switching transistors Q1 and Q3 ON/OFF is connected to the base of transistors Q1 and Q3 which are connected linearly via the coil VCM of the motor. The collector of transistor Q5 is connected to the base of transistor Q1 by voltage divider resistors R8, R9, and the emitter is connected to the base of transistor Q3 together with resistor R10.

In the same way, transistor Q6 for switching transistors Q2 and Q4 ON/OFF is connected to the base of transistors Q2 and Q4 which are connected linearly via the coil VCM. The collector of transistor Q6 is connected to the base of transistor Q2 by voltage divider resistors R12, R13, and the emitter is connected to the base of transistor Q4 together with resistor R14. Diodes D5–D8 prevent reverse bias voltage being applied to the respective transistors Q1–Q4.

2a and 3a are the amplifier parts of control amplifiers 2 and 3 respectively. They drive the H-type push-pull amplifier circuit in the drive amplifier 1 by a phase differential with the respective control input IN. Amplifier 2a assigns a control input IN to the noninverting input of control amplifier AMP1, via the resistor R3, with diode D2 and resistor R4 connected between the noninverting input and ground. The amplifier 2a also has an input resistor R2 connected to the inverting input of amplifier AMP1, the other end of the resistor being connected to a current feedback part. The current feedback part includes, a resistor R1 connected to between the inverting input and ground, and a diode D1 connected between the output and inverting input of amplifier AMP1. Also, the output of control amplifier AMP1 is input to the base of transistor Q7 via resistor R6. The emitter of transistor Q7 is grounded via resistor R5, and the collector is connected to the base of transistor Q5 and resistor R7.

Amplifier 3a inputs a control input IN via an input resistor R18 to the inverting input of control amplifier AMP2 which has a feedback diode D3, and is also connected to a current feedback part via input resistor R19. The noninverting input is grounded via diode D4. The output of control amplifier AMP2 is input to the base of transistor Q8 via resistor R17. The emitter of transistor Q8 is grounded via resistor R16 and the collector is connected to the base of transistor Q6 and resistor R15.

2b and 3b are the current feedback parts of control amplifiers 2 and 3 respectively. The current feed back parts 2b and 3b control the inverting input of control amplifiers AMP1 and AMP2 of the amplifiers 2a and 3a in accordance with the potential at the current detector resistors RS1 and RS2.

When the control input IN is positive, the noninverting input is clamped by diode D2 of amplifier 2a and at the same time the input/output connection of control amplifier AMP1 is shorted by feedback diode D1. Thus, a slight positive potential is generated at the output of amplifier AMP1 and the transistor Q7 does not turn ON.

Therefore, transistors Q1 and Q3 of drive amplifier 1 turn OFF. In amplifier 3a, the output of amplifier AMP2 has a negative potential so the gain through diode D3 becomes infinite. Accordingly, transistor Q8 turns ON, causing transistor Q6 and transistors Q2 and Q4 of drive amplifier 1 to be switched ON also. This causes a current +i to flow in the coil VCM in the right-hand (positive) direction in the drawing, over the routes $V_{CC1}$-diode D9 and resistor R11-transistor Q2-coil VCM-transistor Q4-resistor RS2-($-V_{EE1}$).

On the other hand, when the control input IN is negative, the noninverting input of the amplifier 2b is clamped by diode D4, and a small positive potential is generated at the control amplifier AMP2 output. The transistor Q8 does not turn ON and transistors Q2 and Q4 are turned OFF. In amplifier 2a the output of amplifier AMP1 is a negative potential, transistors Q7 and Q5 turn ON and as a result, transistors Q1 and Q3 turn ON.

Therefore in the coil VCM, current $-i$ is generated in the negative direction (left-hand direction in the drawing), over the routes $V_{CC1}$-diode D9 and resistor R11- transistor Q1-coil VCM-transistor Q3-resistor RS1-($-V_{EE1}$). In this way, amplified current i can be made to flow in the coil VCM in accordance with the control input IN.

In the prior art, this drive circuit was used to induce adhesion, for example, by inputting a positive control input of a specified amplification (adhesion release time amplification), and thus, switching transistors Q2 and Q4 ON and causing an adhesion release current to flow in the coil VCM.

Incidentally, in this adhesion release operation, only a small current is required since it is sufficient to simply move the magnetic head 51 at low speed.

However the H-type push-pull amplifier circuit in the drive amplifier 1 requires a high voltage source, such as ±24 V, so that it can output a current large enough to move the magnetic head at high speed during normal operation. In the electrical distribution of this power source, the remainder of the power consumed by the coil VCM is consumed by the linear operation of transistor Q4.

Figure 3:
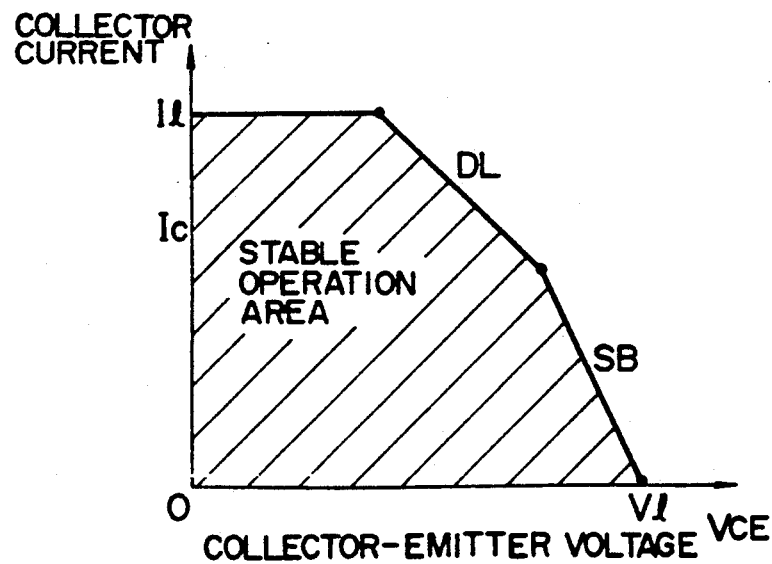
FIG. 3 is a graph representing the characteristics of a power bipolar transistor used in the circuit of the drive amplifier in FIG. 2.

Contrary to this, because only a small current (less than 1 ampere) is required as an adhesion release current to release the adhesion, almost all the voltage (around 40 volts) is passed onto the transistor Q4. As shown in FIG. 3, the performance of the bipolar transistor is limited by a current limit shown by a line I1, a limit of a collector emitter voltage $V_{CE}$ shown by a dot V1, and a wattage limit shown by a line DL. The bipolar transistor is further limited by the second break down limitation of a junction shown by a line SB, to prevent thermal dissipation. As a result, an effective region for actual use of the bipolar transistor is limited to that shown as a shaded stable operation area. Accordingly, when a high voltage is applied to the transistor Q4, the collector current of the transistor Q4 is limited by the second break down line SB, so that the margin of the collector current becomes smaller.

To make this margin even a little larger, a large, expensive, high-voltage power transistor must be used, thus increasing the price and required installation space, for the disk drive. Further, almost all of the high voltage directed onto the transistor Q4 is dissipated as heat, thus not achieving any reduction in power consumption.

Figure 4:
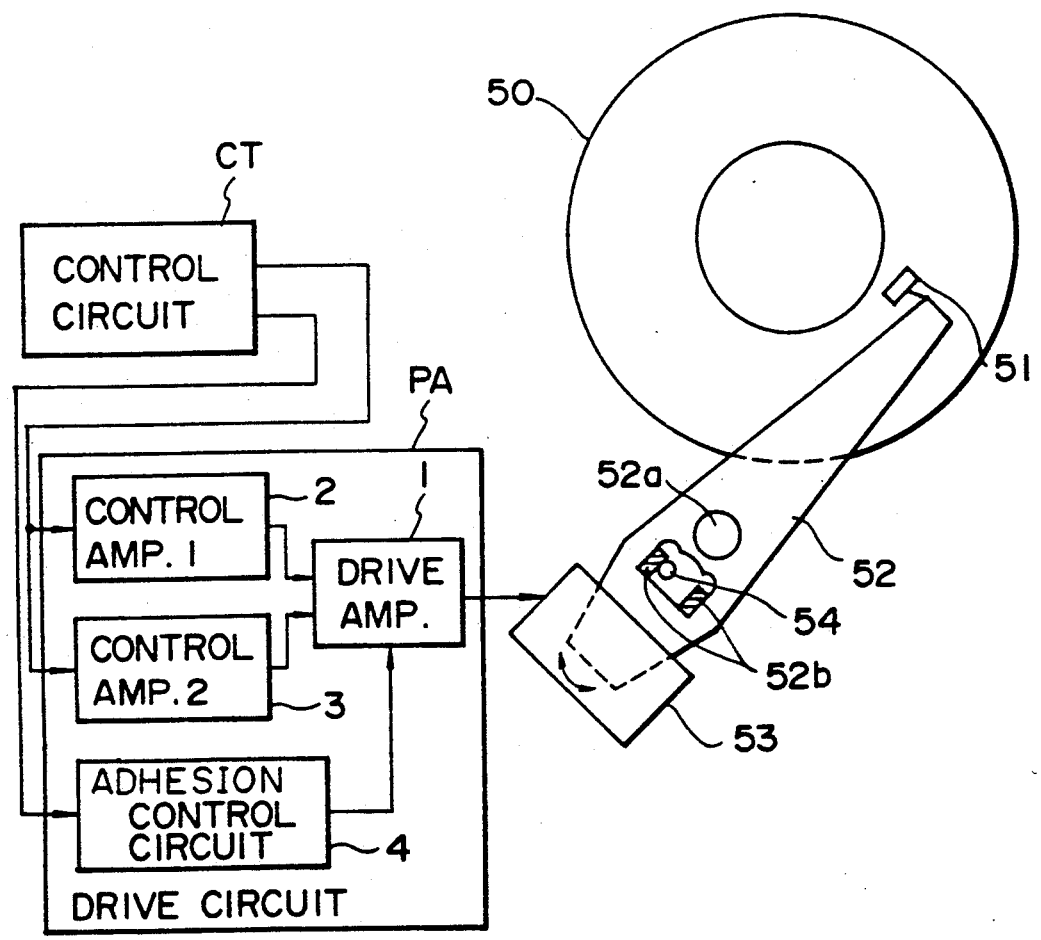
FIG. 4 is a partial plane view and block diagram of a magnetic disk drive according to a first embodiment of the present invention.

FIG. 4 is a magnetic disk drive according to one embodiment of the present invention. In the drawing, parts which are identical to those in FIG. 1 have been identified using the same numbers. The magnetic disk drive uses a motor 53 to rotate a carrier 52 which revolves around an axis 52a with respect to rotating magnetic disk 50, and position a magnetic head 51 mounted on the tip of the carrier 52 at a specified track of the magnetic disk 50. In carrier 53, there is provided a pair of stoppers 52b which restrict the range of movement in relation to a fixed pole 54. These stoppers are made of an elastic material.

The motor 53 is driven by drive circuit PA via a control signal from the control circuit CT. In the drive circuit, there is provided a drive amplifier 1 to drive the motor 53, a pair of control amplifiers 2, and 3 to control the drive amplifier 1 in accordance with the control signal applied from the control circuit CT, and an adhesion control circuit 4 to drive the motor 53 before the rotation of disk 50 in accordance with the adhesion release signal applied from the control circuit CT. In this embodiment, the carrier 52 is positioned in the CSS zone touching one of the stoppers 52b to the fixed pole 54 by the control circuit CT as shown in FIG. 1, when the disk 50 stops rotating.

Figure 5:
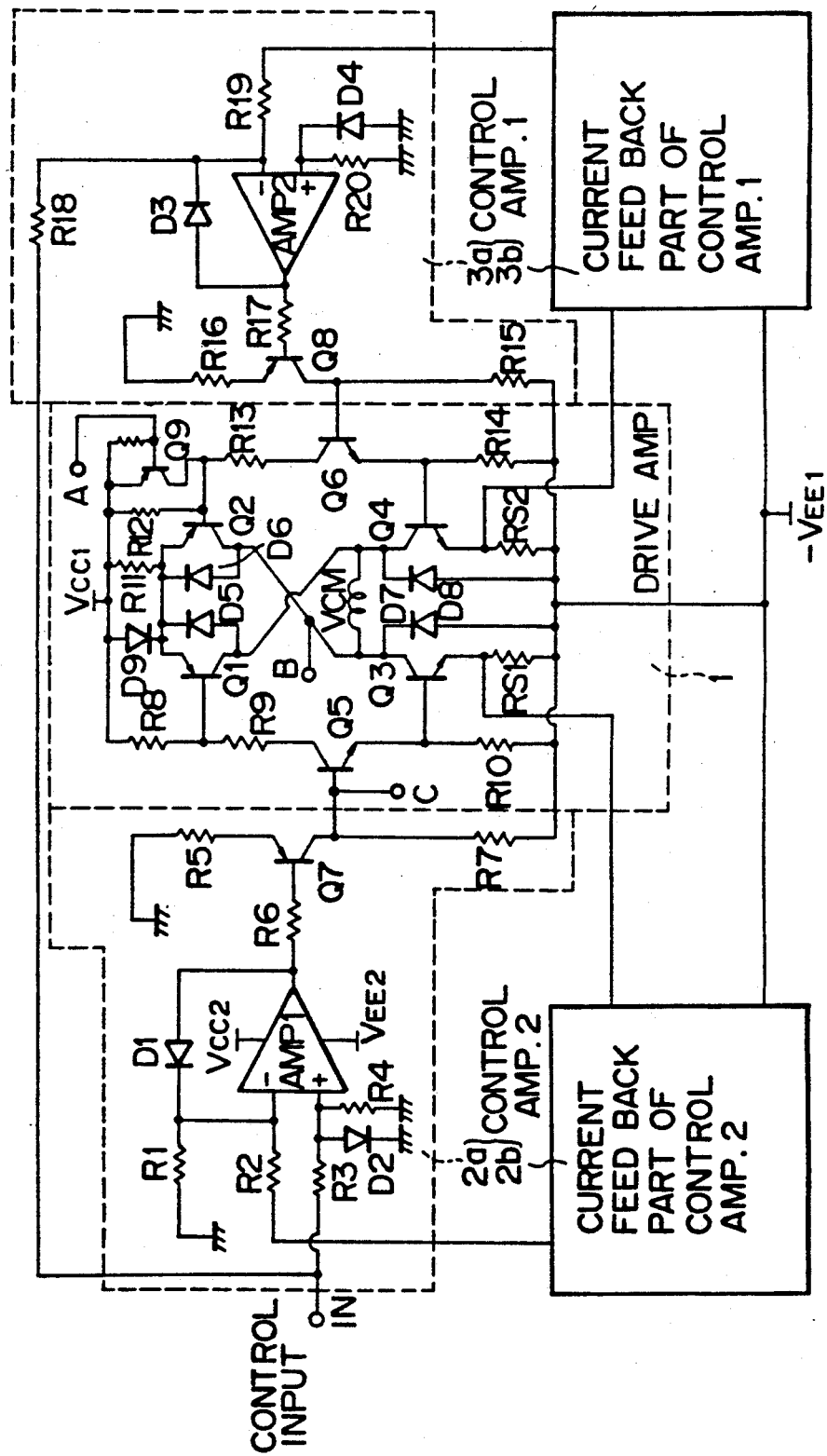
FIG. 5 is a circuit diagram of the drive amplifier and the control amplifiers in FIG. 4 according to the first embodiment of the present invention.

FIG. 5 is a circuit diagram of the drive circuit PA according to one embodiment of the present invention. In the drawings, parts which are identical to those in FIG. 2 have been identified using the same numbers. The drive amplifier 1 is connected as a balanced H-type push-pull amplifier circuit with respect to the coil VCM of the head actuator motor 53 which is driven by the amplifier. The emitters of the upper transistors Q1 and Q2 are commonly connected to the first (positive) power source $V_{CC1}$ via diode D9 and resistor R11, while the emitters of the lower transistors Q3 and Q4 are commonly connected to the second (negative) voltage supply $V_{EE1}$ via the current detector resistors RS1 and RS2. A transistor Q5 for switching transistors Q1 and Q3 ON/OFF is connected in the base of transistors Q1 and Q3 which are connected linearly via the coil VCM of the motor. The collector of transistor Q5 is connected to the base of transistor Q1 by voltage divider resistors R8 and R9, and the emitter is connected to the base of transistor Q3 together with resistor R10.

In the same way, transistor Q6 for switching transistors Q2 and Q4 ON/OFF is connected to the base of transistors Q2 and Q4 which are connected linearly via the coil VCM. The collector of transistor Q6 is connected to the base of transistor Q2 by voltage divider resistors R12 and R13, and the emitter is connected to the base of transistor Q3 together with resistor R14. Diodes D5-D8 are to prevent a reverse bias voltage being applied to the respective transistors Q1-Q4. In this embodiment, transistor Q9 is provided to force transistor Q2 OFF by shorting the emitter and base of transistor Q2, in response to a signal at point A which is connected to an adhesion control circuit 4 described later.

2a and 3a are the amplifier parts of control amplifiers 2 and 3 respectively; they drive the H-type push-pull amplifier circuit in the drive amplifier 1 by a phase differential with the respective control input IN. Amplifier 2a assigns a control input IN to the noninverting input of control amplifier AMP1, via the resistor R3, with diode D2 and resistor R4 connected between the noninverting input and ground; the amplifier 2a further has an input resistor R2 having one end connected to the inverting input of amplifier AMP1 and another end connected to a current feedback part which is described below. A resistor R1 is connected between the inverting input and ground. A diode D1 is connected between the output and the inverting input of amplifier AMP1. Also, the output of control amplifier AMP1 is input to the base of transistor Q7 via resistor R6, the emitter of transistor Q7 is grounded via resistor R5, and the collector of transistor Q7 is connected to the base of transistor Q5 and resistor R7.

Amplifier 3a inputs a control input IN via an input resistor R18 to the inverting input of control amplifier AMP2 which has a feedback diode D3. Amplifier 3a is also connected to a current feedback part via input resistor R19. The noninverting input is grounded via diode D4. The output of control amplifier AMP2 is input to the base of transistor Q8 via resistor R17, the emitter of transistor Q8 is grounded via resistor R16 and the collector of transistor Q8 is connected to the base of transistor Q6 and resistor R15.

2b and 3b are the current feedback parts of control amplifiers 2 and 3 respectively, and control the inverting input of control amplifiers AMP1 and AMP2 of the amplifiers 2a and 3a in accordance with the potential at current detector resistors RS1 and RS2.

Additionally, points B and C are provided connected to an adhesion control circuit 4 described hereinafter. The point B is provided between the collectors of the transistors Q2 and Q3, and the point C is provided to input a signal to the base of transistor Q5.

Figure 6:
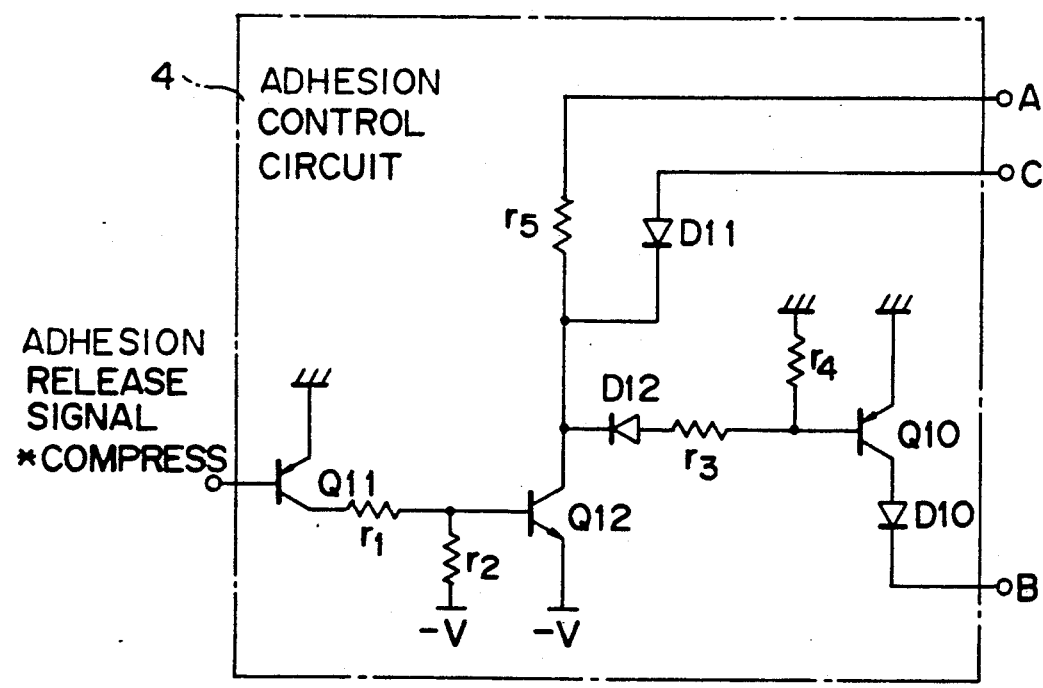
FIG. 6 is a circuit diagram of the adhesion control amplifier in FIG. 4 according to the first embodiment of the present invention.
Figure 7:
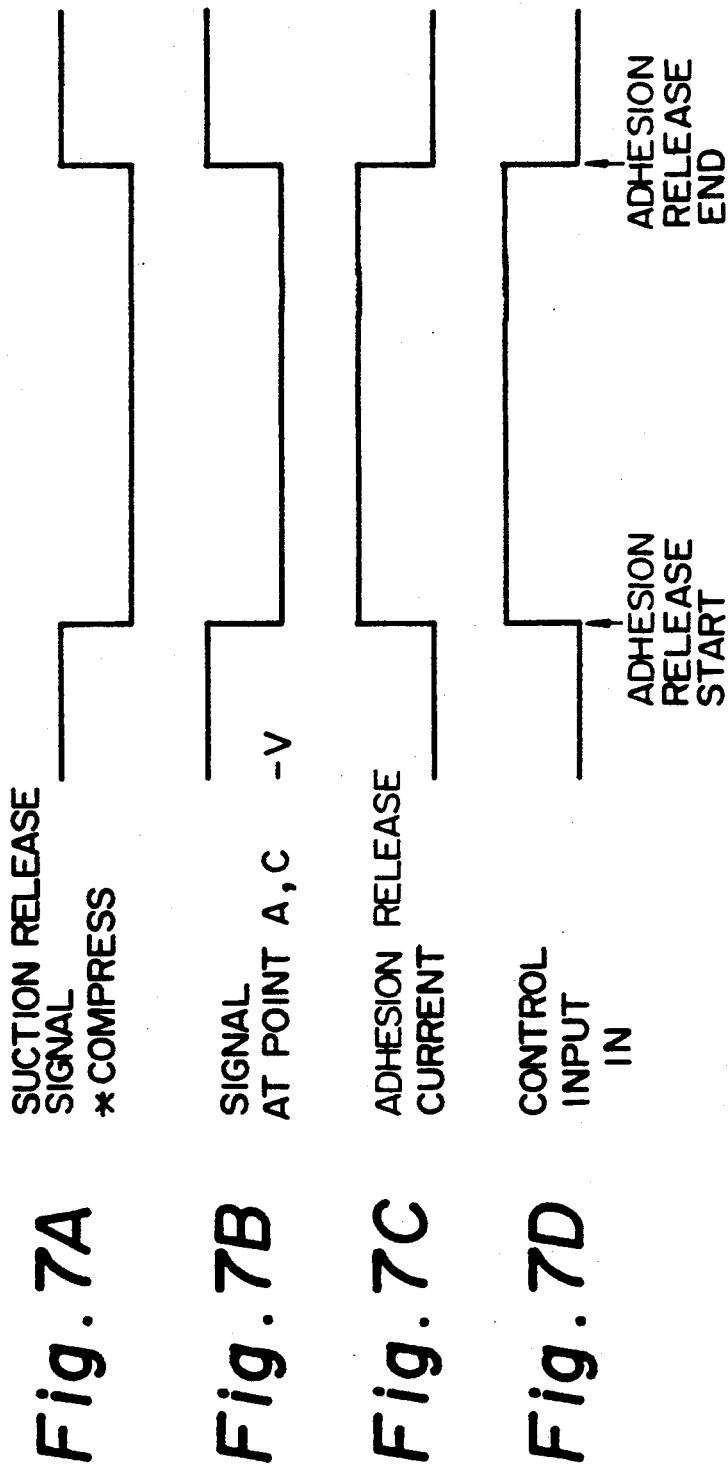
FIGS. 7A to 7D are waveform diagrams of the operation of the circuits in FIGS. 5 and 6.

FIG. 6 shows the adhesion control circuit 4 having points A, B, and C which are connected to the drive amplifier 1. The adhesion control circuit 4 has a first transistor Q11 having an emitter connected to ground, and having a base connected to reserve the adhesion release signal from the control circuit CT. A second transistor Q12 has a base connected to the collector of transistor Q11 via base resistor $r_1$ and to bias resistor $r_2$, and has an emitter connected to $-V$. A resistor $r_5$ outputs the transistor Q12 collector signal at an A point to the base of transistor Q9 of the drive amplifier 1 in FIG. 5. A diode D11 is provided for reverse bias protection and for connecting the collector of transistor Q12 to point C at the base of the transistor Q5 of the drive amplifier 1 in FIG. 5.

Further, the adhesion control circuit 4 has a third transistor Q10 which is connected, at the base, to the collector of transistor Q12, via diode D12 and resistor $r_3$, and through resistor $r_4$ to ground. The emitter of transistor Q10 is grounded, and the collector of transistor Q10 is connected to the reverse bias protection diode D10 to point B of the coil VCM in FIG. 5.

FIGS. 7A to 7D are waveform diagrams of the operation of the circuits in FIGS. 5 and 6. The adhesion release signal *COMPRESS which is input to the base of the transistor Q11 from the adhesion control circuit CT, is low at the start of adhesion release and returns to high at the end of adhesion release. This adhesion release signal *COMPRESS is synchronized with control input IN at the control amplifiers 2a and 3a for adhesion release. To achieve adhesion release, this control input IN is input to amplifiers 2a, 3a of control amplifiers 2, 3, and the adhesion release signal *COMPRESS is input to adhesion control circuit 4.

In adhesion control circuit 4, transistor Q11 is switched ON by the adhesion release signal *COMPRESS becoming low. This causes transistor Q12 to be switched ON also. When transistor Q12 turns ON, the potential at point A and point C via the resistor $r_5$ and the diode D11, is almost $-V$. When the potential at point C becomes negative, transistor Q9 of drive amplifier 1 turns OFF, thus forcing transistors Q1 and Q2 OFF. Further, when the potential at point A becomes negative, transistor Q9 of drive amplifier 1 turns ON, causing a short across the collector/base of transistor Q2, and causing a forced OFF of transistor Q2 which should be ON according to control input IN.

Therefore, through control input IN, the transistor Q6 of the drive amplifier 1 turns ON, turning ON only transistor Q4. Because of the switching ON of transistor Q12 in the adhesion control circuit 4, the base of the third transistor Q10 goes low via diode D12 and resistors $r_3$, $r_4$, and transistor Q10 is switched ON. When transistor Q10 is switched ON, point B of the coil VCM is grounded. This forms a path to ground via transistor Q10-diode D10-coil VCM-transistor Q4-negative power source-$V_{EE1}$, and an adhesion release current is caused to flow in the coil VCM with a negative power source only. In other words, the coil VCM is driven by a single power source of $-24$ V. Therefore, half of the normal voltage is applied to the coil VCM and the transistor Q4, and adhesion release occurs.

This allows transistor Q4 to be used, even at a low voltage, within the large excess dissipation limit area DL, without operating in the second breakdown area SB, of FIG. 3B. This means that transistor Q4 can be constructed of smaller and cheaper transistors with lower resistances, and considerable power savings can be realized.

When at the end of adhesion release, the adhesion release signal *COMPRESS goes high, the transistor Q10, Q11, Q12 of adhesion control circuit 4 turn OFF, the potential at points A and C return to their original values, the forced OFF of transistor Q1, Q2, and Q3 is released, and the potential at point B is no longer grounded. Thus, drive operation is enabled through a control input IN using the normal positive and negative potentials $+V_{CC1}$, $-V_{EE1}$.

Note that the forced OFF of transistor Q2 is designed to prevent it from being switched ON via the control input. The forced OFF of the transistors Q1 and Q3 is designed to prevent them from being switched ON through a changed in the potential caused by the grounding of the coil VCM.

Figure 8:
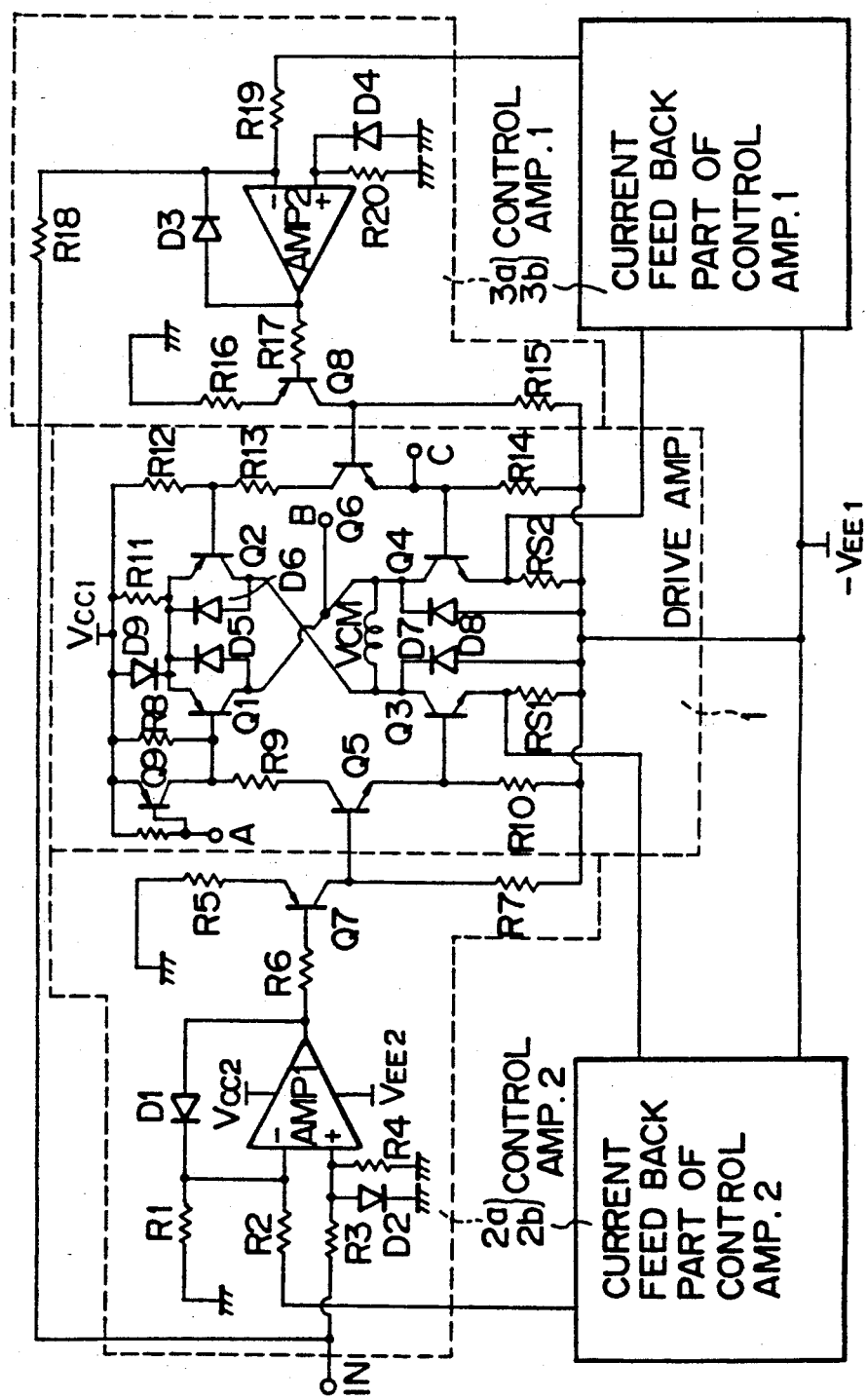
FIG. 8 is a circuit diagram of the drive amplifier and the control amplifiers in FIG. 4 according to a second embodiment of the present invention.

The foregoing paragraphs have described an embodiment in which the transistor Q4 is driven for the purpose of adhesion release. However, when a current is applied in the reverse direction to the coil VCM, it will drive transistor Q3. In this case, the point C is replaced by the collector of transistor Q8, point A is replaced by the base point of the transistor Q9 set up as transistor Q1, and point B is changed to the connection point on the transistor Q1 side of the coil VCM as shown in FIG. 8.

Also, the motor 53 has been described as a rotating type voice coil motor, but any other brushless direct current motor may be used, or the carrier may be a direct drive type rather than a swing arm type. In this case a direct drive voice coil motor has been used.

In the above description, this invention has been explained through its embodiments; however, several variations are possible in accordance with the concept of this invention, and the invention is not limited to these embodiments.

We claim:
1. A magnetic disk drive comprising:
a rotating magnetic disk;
a carrier for supporting a magnetic head for reading or writing data on said disk;
a motor, operatively connected to said carrier, for moving said carrier;
a drive circuit, operatively connected to said motor, for driving said motor; and
a control circuit, operatively connected to said drive circuit, for applying a control signal and an adhesion release signal to said drive circuit;
said drive circuit including:
a bridge circuit, operatively connected to said motor, and having first and second ends, four transistors for driving a coil of said motor, said coil having two ends, one pair of opposite junctions of said four transistors being connected to first and second power sources respectively, and the order pair of opposite junctions of said four transistors being connected to said first and second ends of said coil;
a pair of control amplifiers, operatively connected to said bridge circuit, for controlling said bridge circuit to drive said coil in a positive or negative direction in accordance with a control input signal from said control circuit, said pair of control amplifiers turning ON one pair of opposing transistor at the same time; and an adhesion control circuit, operatively connected to said bridge circuit, for controlling said bridge circuit to drive said coil in one direction in accordance with an adhesion release command from said control circuit before said disk begins to rotate, said adhesion control circuit turning ON only one of said four transistor connected to said first end of said coil and connecting said second end of said coil to a medium level point between said first and second power sources.

2. A magnetic disk drive as set forth in claim 1, wherein said first and second power sources comprises a positive and a negative power source.

3. A magnetic disk drive as set forth in claim 2, wherein said medium level point is ground.

4. A magnetic disk drive as set forth in claim 1, wherein said motor comprises a rotating type voice coil motor.

5. A magnetic disk drive as set forth in claim 1, wherein said motor comprises a brushless direct current motor.

6. A magnetic disk drive as set forth in claim 1, wherein said carrier comprises a direct drive type.

7. A magnetic disk drive as set forth in claim 1, wherein said carrier comprises a swing arm type.

* * * * *